United States Patent [19]
Li

[11] Patent Number: 5,675,463
[45] Date of Patent: Oct. 7, 1997

[54] SLIDER WITH A TRANSPARENT COATING ON A RAIL AND A REFLECTIVE MATERIAL WITHIN A RECESS OF THE RAIL

[75] Inventor: Yufeng Li, Fremont, Calif.

[73] Assignee: Samsung Electronics, Inc., Richfield Park, N.J.

[21] Appl. No.: 568,955

[22] Filed: Dec. 7, 1995

[51] Int. Cl.$^6$ ............................. G11B 21/24; G11B 17/32
[52] U.S. Cl. ........................ 360/137; 360/109; 360/103
[58] Field of Search ..................................... 360/137, 103, 360/109, 122, 126

[56] References Cited

U.S. PATENT DOCUMENTS

| | | | |
|---|---|---|---|
| 4,630,926 | 12/1986 | Tanaka et al. | 356/359 |
| 4,866,553 | 9/1989 | Kubo et al. | 360/103 |
| 5,159,508 | 10/1992 | Grill et al. | 360/103 |
| 5,410,402 | 4/1995 | Li et al. | 356/243 |

Primary Examiner—Craig A. Renner
Attorney, Agent, or Firm—Blakely Sokoloff Taylor & Zafman

[57] ABSTRACT

A slider which has a totally reflective surface that can be used by an optical measuring system to measure the air bearing height of a head gimbal assembly ("HGA"). The slider has a rail with a recess area. The rail is coated with a first film that is thin enough to allow a light beam to transmit through the film and reflect from an interface within the slider. The recess contains a second film that does not transmit light so that a directed light beam is totally reflected from the second film. The outer air bearing surface of the first film is separated from the outer surface of the second film by a height H which is measured before the HGA is tested. The HGA is then placed adjacent to a rotating disk to create an air bearing with a height Hp. The outer surface of the second film is separated from the disk by a height Hv. An optical system directs a light beam into the recess to measure the height Hv between the disk and the outer surface of the second film. The air bearing height Hp is calculated by subtracting the known height H from the measured height Hv.

6 Claims, 2 Drawing Sheets

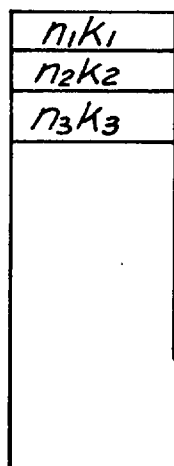
FIG. 1
PRIOR ART
FIG. 2
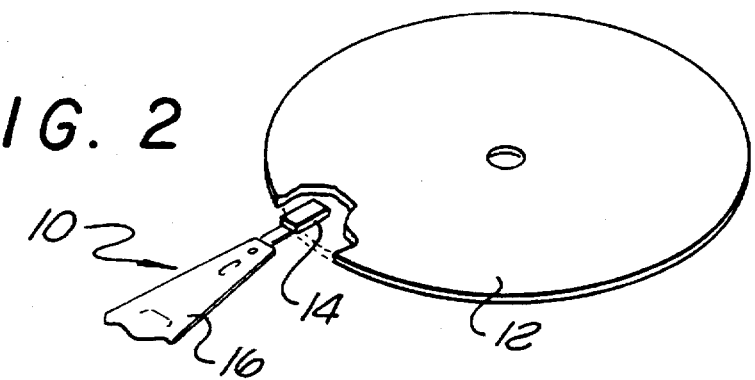
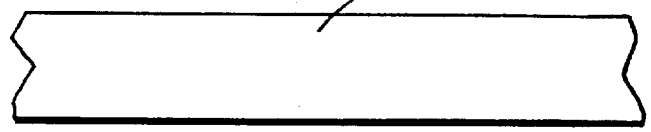
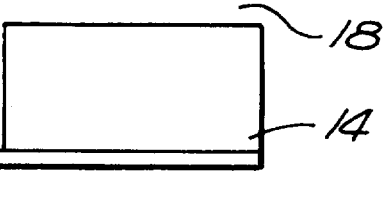
FIG. 3

SLIDER WITH A TRANSPARENT COATING ON A RAIL AND A REFLECTIVE MATERIAL WITHIN A RECESS OF THE RAIL

BACKGROUND OF THE INVENTION

1. Field of the Invention

The present invention relates to a slider for a hard disk drive.

2. Description of Related Art

Hard disk drives contain magnetic heads which magnetize and sense the magnetic field of a disk. The heads are integrated into a slider which is mounted to a suspension arm. The head, slider and suspension arm are commonly referred to as a head gimbal assembly ("HGA"). The HGA is cantilevered from an actuator arm which can move the head across the surface of the disk. The slider has hydrodynamic characteristics that create an air bearing between the head and a rotating disk. The air bearing prevents frictional wear between the disk and the head.

The height of the air bearing is critical to the operation of the disk drive. For this reason the HGAs are typically tested before being installed into a disk drive unit. The HGAs are tested by a flying height tester which measures the height of the air bearing between the head and the disk. Most flying height testers measure the air bearing with a light beam that is reflected from the air bearing interface. The testers contain an optical system that detects and analyzes a change in state of the reflected light beam.

As shown in FIG. 1, to extend product life a hard protective coating 1 may be applied to the air bearing surface of the slider 2. By way of example the coating may be a diamond-like-carbon ("DLC") material that is separated from an underlying substrate by one or more intermediary films 3 and 4. To minimize the separation between the head and disk, the coatings and underlying films are applied as very thin layers, typically in the range of 100 angstroms for the coating, and 25 angstroms for film 3.

Such thin films allow light 5 to transmit through the film and reflect from a film interface within the slider. The coatings and films are applied with different materials which each have a unique complex index of refraction defined by the summation of the real index of refraction n and the extinction coefficient k. For example, the outer coating has a real index $n_1$ and an extinction coefficient $K_1$. The next layer has a real index $n_2$ and an extinction coefficient $K_2$, and so forth and so on. The variation in refraction indexes changes the phase shifts of the reflected light beams. The various phase shifts lower the accuracy of the flying height tester. It would be desirable to provide a slider which would allow a more accurate optical measurement of an air bearing height.

SUMMARY OF THE INVENTION

The present invention is a slider which has a totally reflective surface that can be used by an optical measuring system to measure the air bearing height of a head gimbal assembly ("HGA"). The slider has a rail with a recess area. The rail is coated with a first film that is thin enough to allow a light beam to transmit through the film and reflect from an interface within the slider. The recess contains a second film that does not transmit light so that a directed light beam is totally reflected from the second film. The outer air bearing surface of the first film is separated from the outer surface of the second film by a height H which is measured before the HGA is tested. The HGA is then placed adjacent to a rotating disk to create an air bearing with a height Hp. The outer surface of the second film is separated from the disk by a height Hv. An optical system directs a light beam into the recess to measure the height Hv between the disk and the outer surface of the second film. The air bearing height Hp is calculated by subtracting the known height H from the measured height Hv. The second film provides a test surface that has known optical properties which allow the air bearing height to be more accurately measured than sliders in the prior art.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 1 is a side view of a slider of the prior art;

FIG. 2 is a perspective view of a head gimbal assembly adjacent to a rotating disk;

FIG. 3 is a side view of a slider separated from a disk by an air bearing;

DETAILED DESCRIPTION OF THE INVENTION

Figure 4:
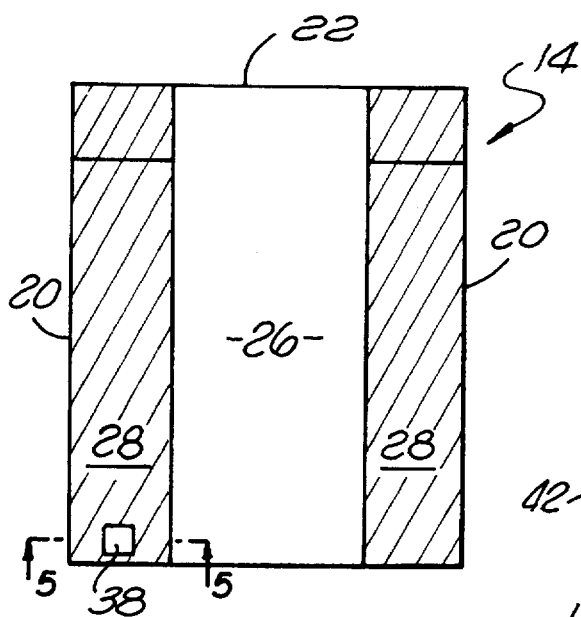
FIG. 4 is a bottom view of a slider of the present invention.

Referring to the drawings more particularly by references, FIG. 2 shows a head gimbal assembly ("HGA") 10 "flying" relative to a rotating disk 12. The head gimbal assembly 10 is typically assembled to a hard disk drive which stores electronic information on the disk 12. The HGA 10 includes a slider 14 that is mounted to a suspension arm 16. The suspension arm 16 is typically cantilevered from an actuator arm (not shown) above, or below, the disk 12. The slider 14 contains a magnetic head that magnetizes and senses the magnetic field of the disk 12.

As shown in FIG. 3, the air flow created by the rotating disk 12 creates an air bearing 18 that separates the slider 14 from the disk surface. The height of the air bearing 18 is critical to the operation of the disk drive. An air bearing that is too small may result in contact between the slider 14 and disk 12, and produce mechanical wear on the magnetic head and disk. An air bearing that is too large reduces the strength of the magnetic field applied to the magnetic head. For these reasons the air bearing height is measured before installation into a disk drive to insure that the HGA 10 meets design target. The film coated slider 14 of the present invention facilitates a more accurate measurement of the air bearing height than film coated sliders of the prior art.

Figure 5:
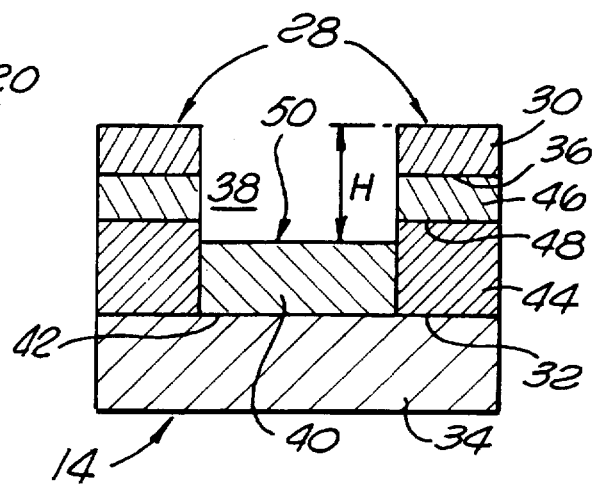
FIG. 5 is a side cross-sectional view of the slider.

As shown in FIGS. 4 and 5, the slider 14 has a pair of rails 20 that extend along opposing edges of the slider 14 between a leading edge 22 and a trailing edge 24. The magnetic pole is typically located at the trailing edge 24 of the slider 14. The rails 20 are separated by a channel 26. The rails 20 create an area of high air pressure that lifts the slider 14 off of a rotating disk 12. The outer surfaces 28 of the rails 20 are commonly referred to as air bearing surfaces ("ABS").

The air bearing surfaces 28 are typically coated with a first film 30 that extends from a first surface 32 of a substrate 34. To minimize the separation between the head and disk, the first film 30 is typically applied as a very thin layer. It has been found that the thin film has a thickness that allows light to transmit through the film and reflect from interfaces 36 and 48 opposite the ABS 28.

The air bearing surface 28 has a recess 38 located near the trailing edge 24 of the slider 14. The recess 38 has a second film 40 that extends from the first surface 32 of the substrate 34. The second film 38 is of a material, and has a thickness, which does not allow light to transmit through the film 40 and reflect from the film/substrate interface 42.

In the preferred embodiment, the second film 40 is constructed from a gold material with a thickness that is at least 50 nanometers. Although gold is described, it is to be understood that other opaque materials may be used. It being preferable to employ noble metals that have known reflective properties and do not oxidize during the normal operation of a hard disk drive. Oxidation may introduce an additional layer of material which will degrade the accuracy of the accuracy of the optical measurement of the slider air bearing height. The second film 40 may be applied to the substrate 34 with sputtering, vapor deposition, or other known processes for creating a thin film of material.

The slider 14 typically has a third film 44 that improves the mechanical/optical properties of the substrate 34 and a fourth film 46 that increases the adhesion between the first film 30 and the third film 44. In the preferred embodiment, the first film 30 is a protective coating of diamond-like-carbon ("DLC"), the substrate 34 is a ceramic material of $Al_2O_3$—TiC or silicon, and the fourth film 46 is an amorphous silicon material. The first 30 and fourth 46 films are typically 100 angstroms (Å) thick, or thinner wherein a light beam can transmit through the films and reflect off of the interfaces 36 and 48. The films each have a different complex index of refraction, which is defined by the summation of the real index of refraction n and the extinction coefficient k. The varying n and k values of each film varies the phase shift of a light beam reflected from the various interfaces and reduces the accuracy of measuring the air bearing height of the HGA 10.

The depth of the recess 38 is defined by the height H between the air bearing surface 28 and the outer surface 50 of the second film 40. After the slider 14 is fabricated, the depth of the recess 38 is measured to determine the height H. The height H can be measured with a stylus profilometer, an atomic force microscope, or any other sufficient measuring means.

Figure 6:
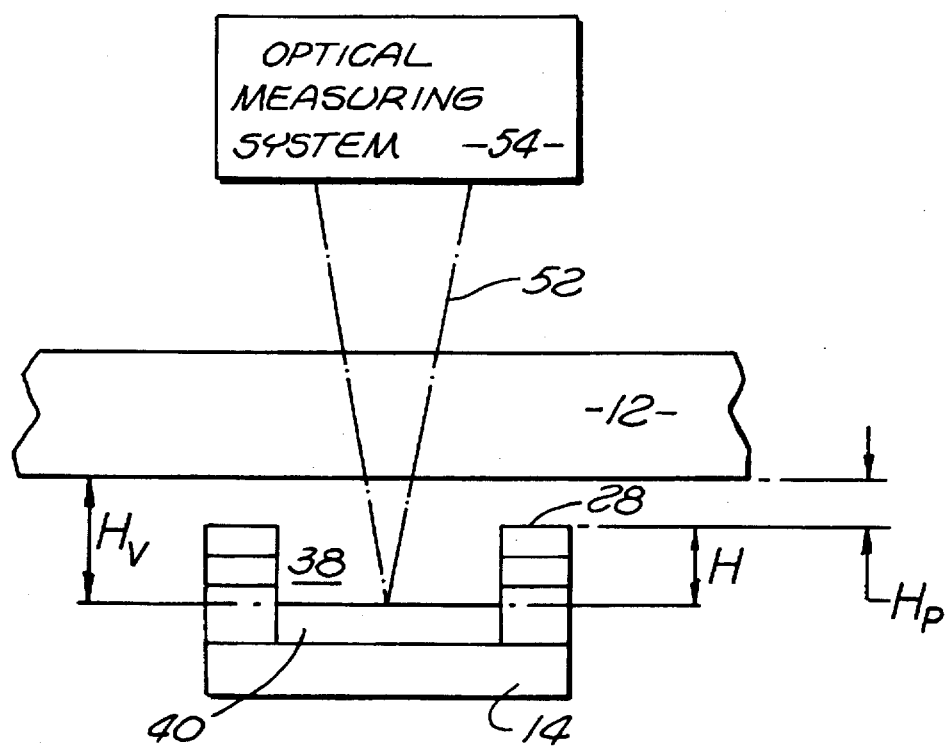
FIG. 6 is a side view similar to FIG. 5 showing an optical tester measuring the height of an air bearing.

As shown in FIG. 6, to measure the air bearing height the slider 14 is placed adjacent to a rotating disk 12. The disk 12 is typically transparent so that a light beam 52 can be emitted, reflected and detected by an optical measuring system 54. The slider 14 is separated from the disk 12 by an air bearing that has a height Hp. Hp is defined as the distance between the disk 12 and the air bearing surface 28. The outer surface 50 of the second film 40 is separated from the disk by a height Hv.

The optical system 54 measures the height Hv by directing the light beam 52 onto the second film 40. The width of the recess 38 should be larger than the diameter of the light beam 52 so that the light beam only reflects from the second film 40. Once the height Hv is measured, the air bearing height $H_p$ can be calculated by subtracting the known height value H from the measured height Hv. The homogenous totally reflective second film 40 provides a surface that has known optical properties which allow the optical system 54 to more accurately measure the height of the air bearing.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

Another application of the present invention is for flying height measurement calibration on film coated air bearing surfaces. Air bearing flying height Hp is directly measured on surface 28, and compared with the expected correct flying height Hv-H. The difference between the expected correct flying height and the measured flying height Hp is the flying height measurement error on surface 28. With this error known, accurate flying height data can be obtained on regular sliders (which do not have recessed area 40) with same film coating. This is achieved by measuring flying height directly on surface 28, and subsequently correcting the measured flying height by using the measurement error.

What is claimed is:

1. A slider for a hard disk drive, comprising:

a substrate that has a rail provided thereon, said rail having disk facing surface and a recess within said disk facing surface;

a transparent first film that covers said disk facing surface to form an air bearing surface thereon about said recess, and which has a thickness that allows light to transmit through said first film; and a reflective second film that is located within said recess so that a light beam is reflectable from said second film, said second film having a thickness that does not allow light to transmit through said second film.

2. The slider as recited in claim 1, wherein said air bearing surface is separated from an outer surface of said second film by a height.

3. The slider as recited in claim 1, wherein said second film is constructed from a gold material.

4. The slider as recited in claim 1, wherein said substrate has a first complex index of refraction, said first film has a second complex index of refraction and said second film has a third complex index of refraction.

5. The slider as recited in claim 1, wherein said first film is separated from said substrate by said rail, which includes a third film and a fourth film.

6. The slider as recited in claim 5, wherein said first film contains a diamond-like-carbon material, said second film contains a gold material, said third film contains an aluminum oxide material, and said fourth film contains an amorphous silicon material.

* * * * *